United States Patent [19]

Avery

[11] Patent Number: 5,531,026
[45] Date of Patent: Jul. 2, 1996

[54] STRIPPING TOOL FOR ARMORED FIBER OPTIC CABLES

[75] Inventor: Douglas E. Avery, Stone Mountain, Ga.

[73] Assignee: AT&T Corp., Murray Hill, N.J.

[21] Appl. No.: 412,406

[22] Filed: Mar. 28, 1995

[51] Int. Cl.⁶ .................................................. B26B 3/00
[52] U.S. Cl. ........................................... 30/90.4; 30/317
[58] Field of Search .................................. 30/90.1, 90.2, 30/294, 314, 317, 90.4

[56] References Cited

U.S. PATENT DOCUMENTS

| | | | |
|---|---|---|---|
| 1,187,386 | 6/1916 | Pehrson | 30/317 |
| 3,180,184 | 4/1965 | Bradley | 30/90.1 |
| 3,571,925 | 3/1971 | Deutschmann | 30/314 |
| 5,142,780 | 9/1992 | Brewer | 30/294 |

*Primary Examiner*—Hwei-Siu Payer

[57] ABSTRACT

A cable armor stripping tool has a shoe for insertion between the core tube and the armor of a fiber optic cable. The shoe has a curved portion which is tapered for lifting and separating ends of the armor as the shoe is slid along the length of the core tube. The shoe is perfably an attachment for an R-4366 cable sheath stripper and is formed from stainless steel. The stripping tool is capable of removing armor from fiber optic cables or other types of cables of different sizes and of different materials without causing damage to the core tube or the fiber bundles. The stripping tool easily performs a mid-sheath entry and can expose the core tube in less time than when a rip cord is used.

15 Claims, 3 Drawing Sheets

5,531,026

STRIPPING TOOL FOR ARMORED FIBER OPTIC CABLES

FIELD OF THE INVENTION

This invention generally relates to a stripping tool and, more particularly, to a tool for stripping armor away from a fiber optic cable.

BACKGROUND OF THE INVENTION

In a typical fiber optic cable, bundles of optical fibers are surrounded by a number of protective layers, with the fiber bundles being encased within a core tube which is then surrounded by a thin layer of armor, which is usually about 5 or 6 mils thick. The core tube is most often formed from a relative soft material, such as polypropylene, and the armor is usually formed from a relative hard material, such as a metal. The outermost layer of the fiber optic cable is a jacket designed to provide protection against the environment within which the fibers are placed. Layers of water blocking material may be formed around both the core tube and the armor within the jacket.

For an installer or lineman to gain access to the fiber bundles, in order, for example, to perform a splicing operation, the various protective layers must be removed in a manner which does not harm the optical fibers within the fiber bundles, thus the removal of the armor from the core tube is a rather delicate procedure which must be accomplished without damaging the core tube or the fiber bundles.

A common approach in the industry for the removal of the armor is to manufacture the fiber optic cables with a rip cord formed from a high tensile strength yarn, such as Kevlar® manufactured by E. I. Du Pont de Nemours and Company. The rip cord is placed between the core tube and the layer of armor opposite a location where ends of the armor circumferentially overlap. To expose the core tube, the armor is cut along the axis of the cable in order to draw a working length of the rip cord. Due to the strength of the rip cord and the thin layer of armor, the rip cord cuts through the layer of armor when the rip cord is pulled in a direction substantially transverse to the axis of the cable. Once the armor has been cut, the armor is separated along the cut to expose the core tube.

The use of a rip cord, however, is not the most reliable or safest approach. The rip cord frequently breaks when it is pulled in the direction transverse to the axis of the cable. One reason for these frequent breaks is that even though the rip cord is a high strength material, the edges of the armor may be sharp enough to sever the rip cord. When the rip cord is pulled, the unexposed portion of the fiber optic cable is pulled at an angle relative to the exposed portion of the fiber optic cable which results in a bending or kinking thereof. This bend or kink in the cable can and often does cause damage to the optical fibers. The smaller fiber optic cables bend more easily and are therefore more prone to this type of damage. There is therefore a need in the industry for a reliable way to expose the core tube which does not cause any damage or at least minimizes damage to the optical fibers.

The use of a rip cord in cutting or separating the armor is also a rather time consuming process and thus economically undesirable. Before the rip cord can be pulled, the armor must first be cut, as by pliers or side cutters, along the axis of the cable to expose enough of the rip cord so that it may be grasped by hand. With a working length of the rip cord exposed, the rip cord can then be pulled in the direction transverse to the axis of the cable to expose the core tube. If the rip cord breaks, which is fairly common, the armor must again be cut to expose another working length of the rip cord. After the desired length of armor has been cut, the armor must then be separated along the cut to expose the core tube. Thus the steps involved in using a rip cord can consume a relatively large amount of time. A need therefore exists for a quick and efficient process to expose the core tube.

In comparison to a splice performed at an end of the fiber optic cable, the use of a rip cord to prepare the cable for a mid-sheath splice is even more complicated. The mid-sheath splice requires an installer or lineman to cut the armor from the center of the cable, which is much more difficult than from the ends of the cable. Because of this difficulty, the mid-sheath splice presents a larger risk that the core tube and, consequently, the fibers will become damaged during the cutting of the armor. In all, the rip cord is harder to access and the core tube is more likely to become damaged with a mid-sheath splice than with a splice performed at an end of the cable.

Some of the smaller fiber optic cables, such as the MINI-LXE, are not manufactured with a rip cord. For these smaller fiber optic cables and others that do not have a rip cord, the process of exposing the core tube is even more difficult since the entire length of the armor must be cut by hand. The use of a pair of pliers or side cutters is a much more time consuming process than the process of exposing the core tube by means of a rip cord. The use of pliers or side cutters also presents a larger risk that the core tube will become damaged. Consequently, a need exists in the industry for a quick and safe manner of exposing the core tube in fiber optic cables which are formed without rip cords.

SUMMARY OF THE INVENTION

The present invention, in a preferred embodiment thereof, is a shoe, which can be attached to a slightly modified standard tool, for separating or removing armor from a fiber optic cable. The shoe has a curved portion with an inner surface and an outer surface. The outer surface of the curved portion has a radius of curvature which increases from one end of the curved surface to an opposite end of the curved surface thus forming, in effect, a wedge. When the inner surface of the curved potion slides along the core tube of the optical fiber cable, the wedging action of the outer surface of the curved portion lifts and separates the armor, thereby exposing the core tube.

Another aspect of the invention, in a preferred embodiment, comprises a stripping tool having a handle, a shoe, and a fastener for attaching the shoe to the handle. As described heretofore, the shoe has a curved portion with an inner surface that slides along the core tube of the optical fiber cable and an outer surface which lifts and separates the armor, thereby exposing the core tube.

The stripping tool is preferably based on a commercially available cable ring cutting tool and the shoe replaces a blade on this tool. The shoe is spaced from the handle by a distance at least equal to the thickness of the outer sheath of the fiber optic cable.

The principles and features of the present invention will be more readily apparent and understood from the following detailed description, read in conjunction with the accompanying drawings.

DETAILED DESCRIPTION

Figure 1:
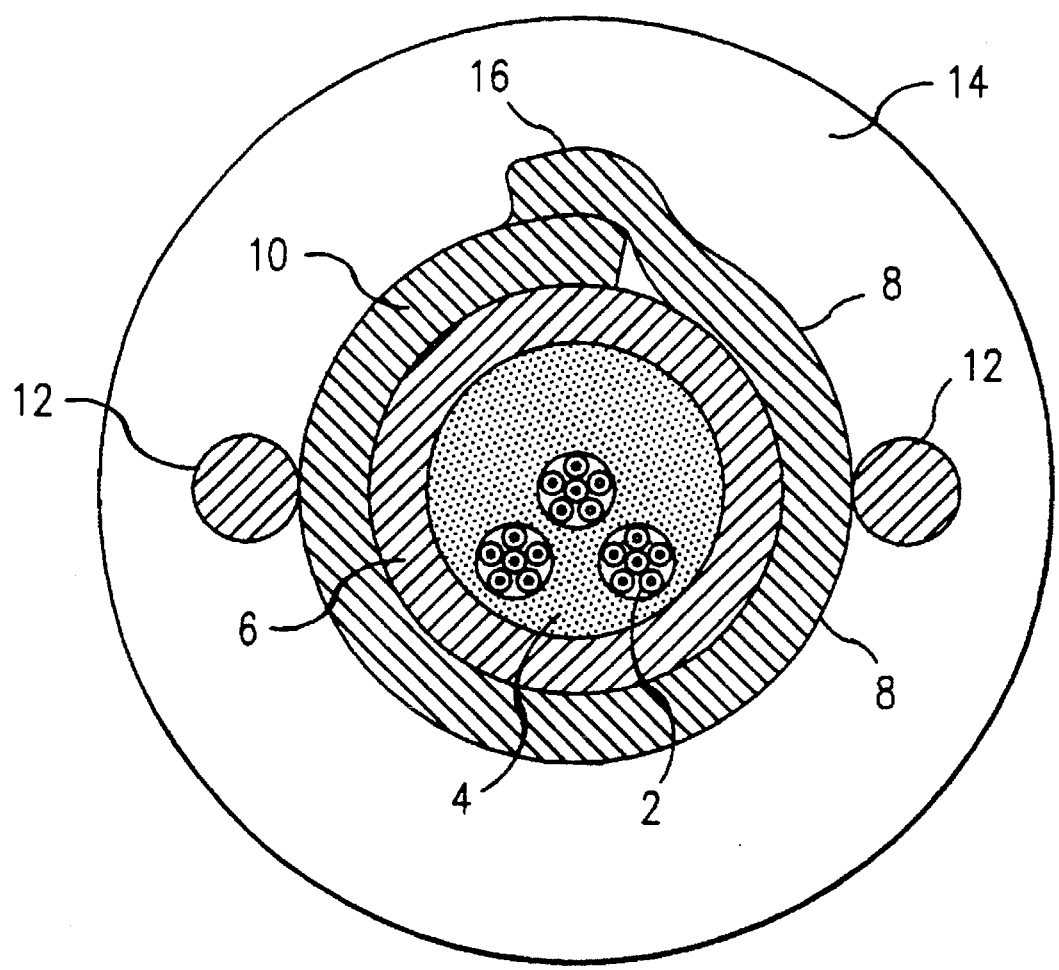
FIG. 1 is a cross-sectional view of a MINI-LXE fiber optic cable.

The MINI-LXE fiber optic cable is an example of an armored optical fiber cable that is formed without a rip cord. As shown in FIG. 1, a MINI-LXE fiber optic cable comprises a plurality of optical fiber bundles 2 surrounded by a protective filling compound 4. The fiber bundles 2 and filling compound 4 are encased in a polypropylene core tube 6 which is surrounded by a layer of armor 10. The armor 10 is preferably formed from electro-chromated carbon steel (ECCS) and is wrapped partially around itself to form an overlap 16. A layer 8 of water blocking material is formed around the outer surfaces of both the core tube 6 and the armor 10. A pair of steel strength members 12 are formed within a jacket 14 of the MINI-LXE fiber optic cable to provide structural rigidity to the fiber optic cable. For the MINI-LXE, the jacket 14 is formed from medium density polyethylene (MDPE). The dimensions given in FIG. 1 and the subsequent figures are for illustrative purposes and are not intended to be limiting.

Figure 2A:
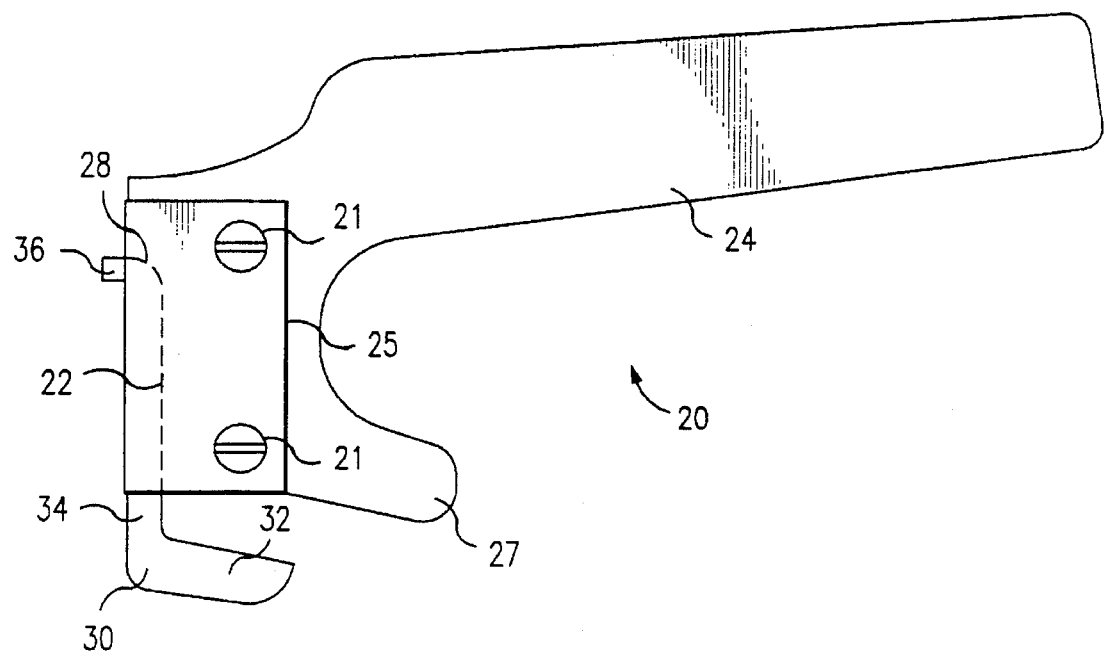
FIG. 2(A) is a side view of a stripping tool according to a preferred embodiment of the invention.
Figure 2B:
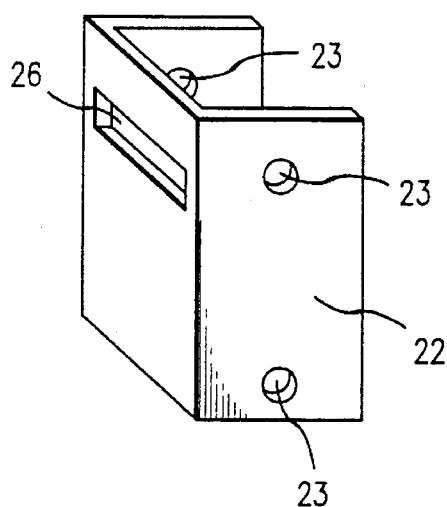
FIG. 2(B) is a perspective view of a retaining bracket.
Figure 3:
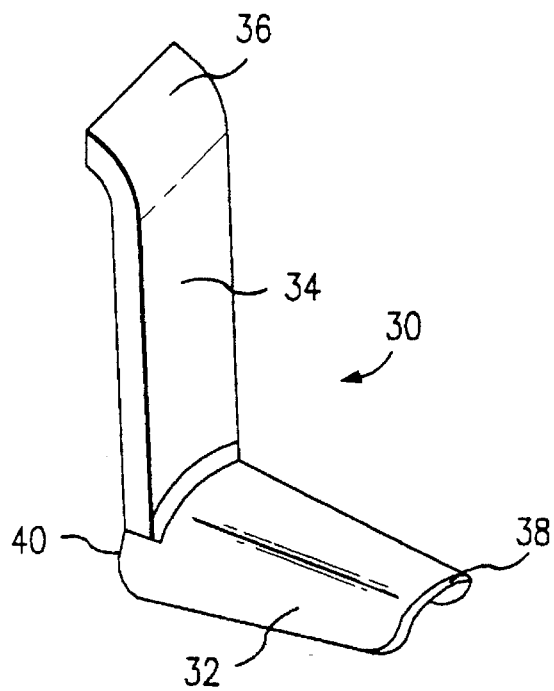
FIG. 3 is a perspective view of a preferred embodiment of a shoe for use with the stripping tool of FIG. 2(A)
Figure 4:
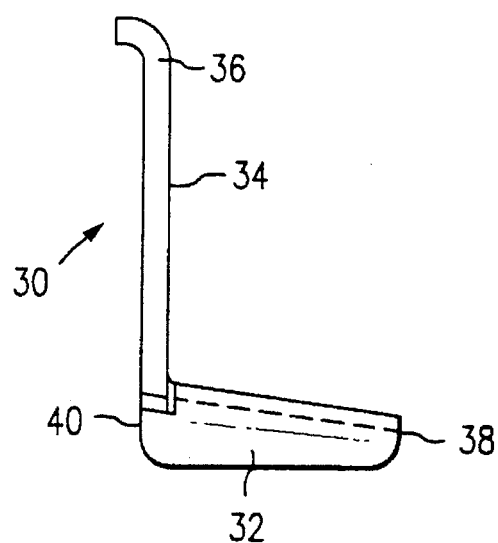
FIG. 4 is a side view of the shoe of FIG. 3.

As shown in FIG. 2(A), a substantially L-shaped stripping tool 20 according to a preferred embodiment of the invention has a handle 24, an extension 25, and a guiding section 27. A shoe 30 is removably attached to the extension 25 via a retaining bracket 22 and screws 21. The shoe 30 is preferably manufactured from stainless steel but may be manufactured from any high strength material, such as a high-strength plastic. The retaining bracket 22, as best seen in FIG. 2(B), has holes 23 for receiving the screws 21 and a transverse slot 26 formed in a front surface of the retaining bracket 22. The shoe 30, as shown in FIGS. 2(A), 3 and 4, has a curved portion 32 which is spaced from the guiding section 27, a straight section 34 held between the retaining bracket 22 and the extension 25, and an angled portion 36 which projects out of the slot 26 in the retaining bracket 22. The tool 20 preferably has a recessed portion 28, shown in dashed lines, for mating with the straight section 34 and angled portion 36 of the shoe 30.

Figure 5:
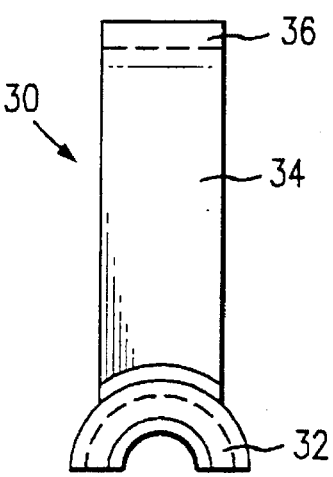
FIG. 5 is a front view of the shoe of FIG. 3.

With reference to FIGS. 3 to 5, the curved potion 32 of the shoe 30 is tapered to have an outer radius increasing from one end 38 of the curved portion 32 to the opposite end 40 of the curved portion 32. In the example shown, the outer surface of the curved portion 32 has a radius of approximately 0.175 inches at end 38 and a radius of approximately 0.350 inches at the opposite end 40. The inner surface of the curved portion 32 has a radius of approximately 0.125 inches at end 38 and a radius of approximately 0.300 inches at the opposite end 40 and the thickness of the curved portion 32 is approximately 0.050 inches uniformly from the one end 38 of the curved portion 32 to the opposite end 40 of the curved portion 32. The radius of the inner surface at end 38 is selected to be no less, and preferably slightly larger, than the radius of the MINI-LXE's core tube 6, which is 0.08 inches.

In operation, the armor 10 is cut or otherwise separated along the axis of the cable at the overlap region 16 with a pair of diagonal cutters for a small distance, such as one inch. The curved portion 32 of shoe 30, attached to tool 20, is then inserted between the core tube 6 and the overlap 16 of the armor 10 and is pulled longitudinally of the cable parallel to the axis on top of the core tube 6. The curved portion 32 lifts and separates the overlapping ends of the armor 10 and flares the ends outwardly by means of the increasing radius from end 38 to opposite end 40 of the curved portion 32. The ends 38 and 40 of the curved portion 32 have curved edges so as to not cause any damage to the core tube 6 as the shoe 30 is slid along the core tube 6. Thus, with a single motion, the armor is separated and flared outwardly to expose the core tube 6.

The stripping tool 20 can also be used to perform a mid-sheath entry easier than previous techniques. When the striping tool 20 is to be used to expose the core tube 6, the overlap 16 of the armor layer 10 needs to be separated just enough for the insertion of the curved portion 32. Once that portion 32 of the stripping tool 20 is inserted, the stripping tool 20 is pulled along the length of the cable to separate the ends of the armor layer 10 and expose the core tube 6. Thus the operation of cutting the armor 16 is minimized, thereby reducing the risk of any damage.

The stripping tool 20 is capable of separating the armor and exposing the core tube in optical fiber cables other than just the MINI-LXE. For instance, the stripping tool 20 can separate armor formed from materials other than ECCS, such as stainless steel. The stripping tool 20 has been found to work effectively with the standard sizes of the LXE fiber optic cables, such as the 0.51 inch outer diameter cable, the 0.61 inch outer diameter cable, and the 0.71 inch outer diameter cable. Thus, the stripping tool 20 can operate with core tubes and armors of different diameters and of different materials than that of the MINI-LXE. Moreover, the stripping tool 20 can be used to expose and separate armor type materials in products other than optical fiber cables. For instance, the stripping tool may be used to remove and separate an armor-type layer in an electrical cable. Other uses of the stripping tool 20 will be apparent to those skilled in the art.

The dimensions of the stripping tool 20 may be varied from that shown. The space between the curved portion 32 and the guiding section 27 should at least be as large as the thickness of the armor layer overlap 16. With this spacing, the ends of the armor 10 do not contact the section 27 but are instead flared outwardly away from each other and from the core tube 6. Also, while the stripping tool 20 may be used with a range of cable sizes, the range of radiuses for the outer surface of the curved portion 32 may be modified according to the size of a particular fiber optic cable. For example, both ends 38 and 40 of the curved portion 32 may be larger than that shown. Other variations in design will be apparent to those of ordinary skill in the industry.

The use of the stripping tool 20 is a safer and more reliable method of exposing a core tube than previously available, and it can work effectively without requiring an installer or lineman to cut a large portion of the armor sheath 10. Since the stripping tool 20 is pulled along parallel to the axis of the cable, the cable does not tend to kink or bend, thus this cause of damage to the core tube or the fiber bundles is substantially eliminated.

In comparison to previous stripping techniques or tools, the stripping tool 20 of the invention also allows quicker access to the core tube 6 in the MINI-LXE fiber optic cable and to core tubes in other cables, including those that have rip cords. The process of exposing a core tube with the striping tool 20 just has the one step of pulling the tool 20 along the axis of the cable. Since the process does not include the steps of curing along a large length of the cable or manually separating the armor sheath with pliers or side cutters, the core tube can be exposed much quicker with consequent savings in time and expense. The stripping tool 20 is more reliable than rip cords, and, when the frequent breaks associated with a rip cord are taken into consideration, is economically to be preferred.

The stripping tool 20 is advantageously based upon a commonly used cable ring cutting tool, also referred to as a button stripper, a cable butter, and an R-4366 stripping tool. The cable ring cutting tool was originally used to slice the outer jacket of a copper cable longitudinally and had a blade and a blade guard held by the retaining bracket 22. The shoe 30 preferably fits within the retaining bracket 22 of this cable ring cutting tool. A cable splicer therefore need not carry an entirely new tool but may instead attach the shoe 30 to the existing cable ring cutting tool. Furthermore, if the dimensions of the shoe 30 are varied to fit other cables more precisely, then the cable splicer only needs to have a set of shoes 30, rather than a set of tools. The shoe 30 of the invention is thus a cost effective method of opening fiber optic cables of various sizes and of various materials.

The shoe 30 has been disclosed as having an inner surface which has a radius of curvature which increases from one end 38 to the opposite end 40 of the curved portion 32. The inner surface, however, may be formed to have a uniform radius of curvature from the one end 38 to the opposite end 40. This uniform radius of curvature would be selected based on the particular size of the core tube being exposed. With the radius of curvature for the inner surface remaining uniform, the thickness of the curved portion would consequently increase from the one end 38 to the opposite end 40 in order for the radius of curvature of the outer surface to increase from the one end 38 to the opposite end 40, thereby acquiring a wedge shape.

The foregoing has been illustrative of the features and principles of the present invention. Various changes or modifications to the invention may be apparent to workers in the art without departure from the spirit and scope of the invention.

I claim:

1. A stripping tool for separating armor from a signal transmission cable, comprising:

a shoe including a curved portion having a curved surface with first and second ends, said curved surface having a radius of curvature which increases from said first end of said curved surface to said second end of said curved surface;

a handle; and a bracket for removably attaching said shoe to said handle;

whereby when said handle is pulled and an inner surface of said curved portion slides along a core tube of said cable, said curved surface lifts and separates said armor, thereby exposing said core tube.

2. The stripping tool as set forth in claim 1, wherein said shoe is comprised of stainless steel.

3. The stripping tool as set forth in claim 1, wherein said shoe comprises a straight section for being held between said bracket and said handle and an angled section projecting through a hole in said bracket.

4. A stripping tool for separating armor from a signal transmission cable, comprising:

a shoe including a curved portion having a curved surface with first and second ends, said curved surface having a radius of curvature which increases from said first end of said curved surface to said second end of said curved surface, wherein said radius of curvature of said surface at said first end is approximately one-half of said radius of curvature at said second end;

a handle; and means for attaching said shoe to said handle;

whereby when said handle is pulled and an inner surface of said curved portion slides along a core tube of said cable, said curved surface lifts and separates said armor, thereby exposing said core tube.

5. A stripping tool for separating armor from a signal transmission cable, comprising:

a shoe including a curved portion having a curved surface with first and second ends, said curved surface having a radius of curvature which increases from said first end of said curved surface to said second end of said curved surface;

a handle;

means for attaching said shoe to said handle;

said curved surface of said curved portion being spaced from said handle a distance at least as large as a thickness of an outer jacket of the cable, and whereby when said handle is pulled and an inner surface of said curved portion slides along a core tube of said cable, said curved surface lifts and separates said armor, thereby exposing said core tube.

6. A shoe for removing armor from an optical fiber cable, comprising:

a curved portion with a first curved surface having a radius of curvature increasing from one end of said curved surface to an opposite end of said curved surface, and a second curved surface wherein said second surface of said curved portion is adapted to fit over and slide along a core tube of said optical fiber cable; and a straight section for being held on a tool by a retaining bracket and an angled section for projecting through said retaining bracket, said first curved surface of said curved portion being configured to lift and separate said armor, thereby exposing a core tube of said optical fiber cable.

7. A shoe as set forth in claim 6, wherein said radius of curvature of said first curved surface at said one end is approximately 0.175 inches and said radius of curvature at said opposite end of is approximately 0.350 inches.

8. The shoe as set forth in claim 6, wherein said shoe is comprised of stainless steel.

9. The shoe as set forth in claim 6, wherein said second curved surface of said curved portion has a radius of curvature which increases from said one end to said opposite end of said first curved surface.

10. The shoe as set forth in claim 6, wherein said second curved surface of said curved portion has a constant radius of curvature from said one end to said opposite end of said first curved surface.

11. A stripping tool for separating ends of an armor sheath from an optical fiber cable having a core tube, said tool comprising:

a shoe member having a curved portion having first and second ends and inner and outer surfaces;

said outer surface of said curved portion having a radius of curvature which increases from said first end to said second end;

said inner surface of said curved portion having a radius of curvature;

a handle member; and a retaining bracket for attaching said shoe member to said handle member with said shoe member depending therefrom;

whereby when said tool is moved along the cable parallel to a longitudinal axis thereof with said inner surface substantially in contact with the core tube, said outer surface lifts and separates the ends of the armor to expose the core tube.

12. The stripping tool as set forth in claim 11, wherein said retaining bracket is affixed to said handle member.

13. The stripping tool as set forth in claim 12, wherein said radius of curvature of said outer surface at said one end is approximately 0.175 inches and said radius of curvature at said opposite end is approximately 0.350 inches.

14. The stripping tool as set forth in claim 12, wherein said shoe member is comprised of stainless steel.

15. The striping tool as set forth in claim 12, wherein said shoe member comprises a straight section for being held between said retaining bracket and said handle member and an angled section projecting through a slot in said retaining bracket.

* * * * *